Sept. 9, 1930.  R. CHILTON  1,775,513
WING BRACING STRUCTURE
Filed March 23, 1929  2 Sheets-Sheet 1
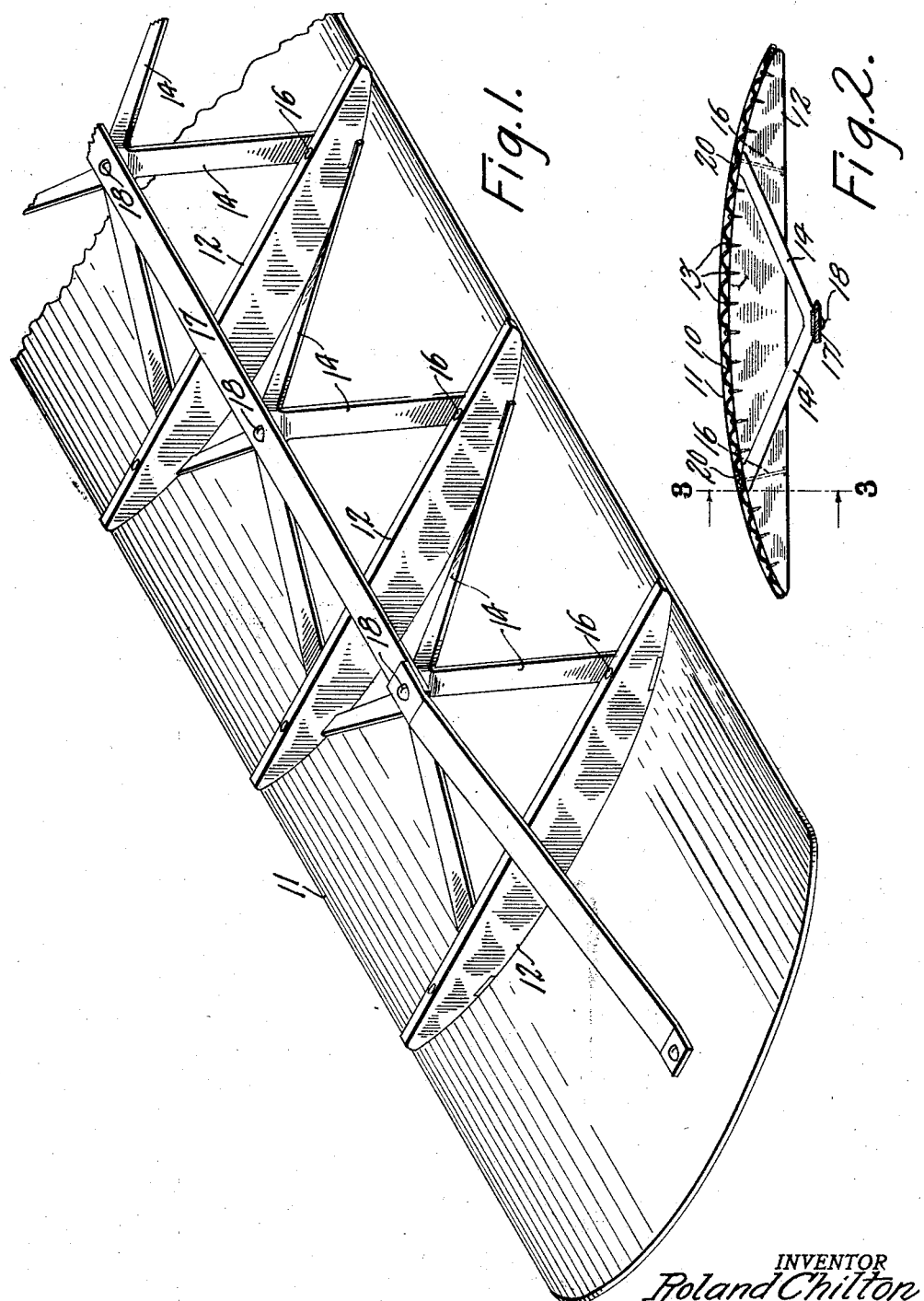

Sept. 9, 1930.    R. CHILTON    1,775,513
WING BRACING STRUCTURE
Filed March 23, 1929    2 Sheets-Sheet 2
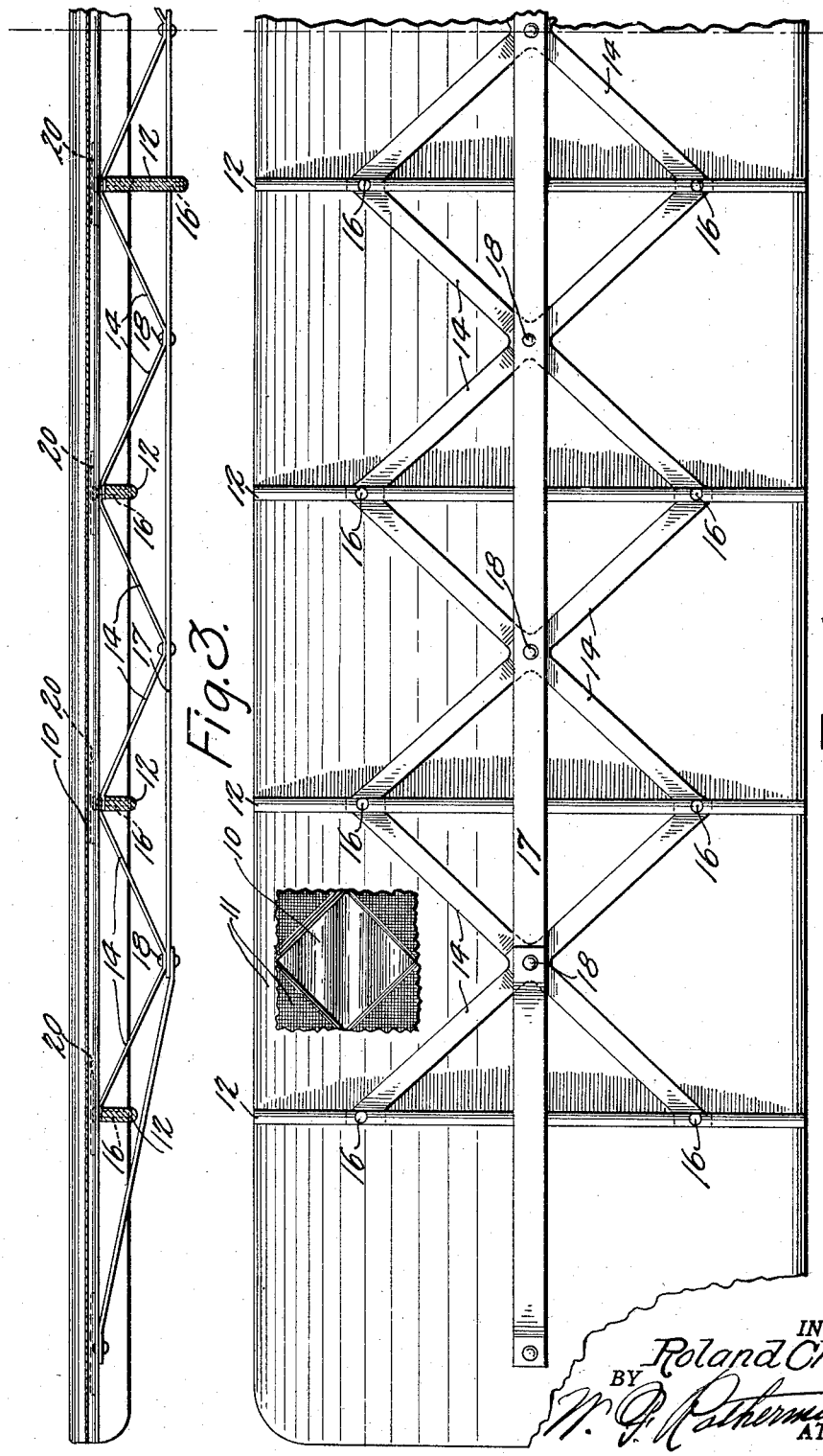
INVENTOR
Roland Chilton
BY
W. J. Rothermund
ATTORNEY Patented Sept. 9, 1930

1,775,513

UNITED STATES PATENT OFFICE

ROLAND CHILTON, OF KEYPORT, NEW JERSEY, ASSIGNOR, BY MESNE ASSIGNMENTS, TO UPPERCU-BURNELLI CORPORATION, A CORPORATION OF DELAWARE

WING-BRACING STRUCTURE

Application filed March 23, 1929. Serial No. 349,502.

This invention relates to structures as for bracing the wings of an aeroplane to the body. One of the objects of the invention is to provide a wing and bracing structure having a minimum aggregate weight and aerodynamic drag for a given wing area and strength.

The prime importance, in aeroplane structures, of minimum parasite drag (drag from which no useful lift component is derived) is well understood, but only a part of the total drag (the induced drag) of an air foil itself has a useful lift component, a substantial part, including the skin friction and the drag due to the thickness or frontal area of the airfoil (profile drag) being chargeable to the depth of the usual wing spars and properly belonging under the heading of "parasite resistance". The gain often attributed to the shielding of all the wing braces between the upper and lower wing surfaces by the use of thick wing sections may not be apparent when the added profile drag and skin friction area are included in the estimate of the parasite resistance of the entire structure.

A conventional airfoil section may be regarded as a stream line form thick enough to embrace the wing spars and having its median line curved to the desired camber, resulting in the familiar relatively flat lower surface and exaggerated upper surface camber of the thick wing section, wherein the lower surfaces contribute little to the lift at small angles of incidence.

The depth of wing spar necessary depends upon the unsupported length, which ranges from the entire extension of the wing from the fuselage attachments in full cantilever designs; to the relatively short distance between the trussed points (the length of bay) in an externally braced type.

External bracing includes strut members in which the permissible slenderness ratio (length/width) must be limited to avoid buckling failure; and here again increased subdivision into bays reduces the length; and therefore the width, of the individual members, at the expense of an increased number of members. The present invention provides a bracing system for lift, drag, torsion, and reversed loading so simplified, particularly as to the number of exposed members per bay, as to permit the economical use of a relatively large number of bays giving relatively short and narrow members, and so reducing the length between the wing bracing points as to permit of an extraordinary reduction in the required spar depth; and in the extreme case illustrated to eliminate the usual wing spars entirely.

The extreme thinness of airfoil illustrated in the drawings may not be desirable in conventional aeroplanes wherein the longitudinal control involves extreme angles of attack, whereat the relatively sharp entering edge would induce a more sudden loss of lift than with the blunt round nosed forms of the thick, slow speed wing sections. It is to be understood however, that where such considerations predominate the appropriate thickness may be given to any part of the wing curve without departing from the spirit of this invention.

A further object of the invention is to afford a structure wherein certain of the main structural members may consist of the wing surface member or members themselves. These may of course be of single thickness, laminated, cellular or composite construction, the specific embodiment shown including a corrugated metal sheet covered with fabric.

Substantial torsional stiffness is desirable in wing structure and is usually sought by the use of two or more spaced apart spars or beams having upper and lower flange elements, a plurality of ribs being extended across the spars, which, by their resistance to relative vertical displacement, resist relative angular displacement of the ribs.

Torsional strength and stiffness are attained in the present invention by a novel system wherein V braces or equivalent members extend away from the ribs and wing surface to a point of union substantially to one side of the surface. As viewed from the end of the wing, such members will be seen to comprise "torque arms" resisting relative angular displacement between adjacent ribs, which displacement would require opposite movement of the extended and connected ends of the bracing members. The ribs and rib ends of the bracing members are restrained against movement in the wing surface by rigid attachment to the wing surface member itself, so that an extended series of the elements described comprises a structure whose torsional stiffness is defined by the stiffness of the wing member (with the attached ribs) to distortion in its own plane, and by the resistance of the united braces to rotation (in end aspect) relative to the rib. The members have natural rigidity in these directions even though they may be individually weak in bending.

However, even though the wing surface be considered as a thin sheet, it will be seen that, by virtue of the cambered form enforced by the attached ribs, substantial compressive strength and resistance to distributed loading, in the short bays between the ribs is achieved. The corrugated section illustrated greatly increases the resistance against buckling and incidental local loading. So long as such a curvilinear section is maintained by the ribs the effective compressive strength of the wing surface member therebetween may closely approach that due to its entire cross sectional area in pure compression.

Considered in front aspect it will now be seen that, by the addition of a single member secured to the points of union of the braces described, a complete wing truss is formed having short unsupported lengths suited to thin members and utilizing the wing surface member itself as a major part of the truss thus reducing the aggregate number, length and width and hence the head resistance of the exposed members. This, with the drastic reduction in the thickness of the wing, effects a substantial saving in the parasite head resistance which is in conformity with the objects of the invention.

Various other objects and advantages of the invention will be in part obvious from an inspection of the accompanying drawings and a careful consideration of the following particular description and claims of one form of mechanism embodying my invention.

In the drawings:—

Fig. 1 is a fragmentary inverted perspective view of a wing structure embodying my invention.

Fig. 2 is a cross section of the wing shown in Fig. 1.

Fig. 3 is a longitudinal section 3 taken on the line 3—3 of Fig. 2.

Fig. 4 is an inverted plan view.

In the specific embodiment of the drawings, the wing surface member consists of a corrugated sheet 10 of material such as rolled aluminum alloy, a suitable covering such as fabric 11 being provided therefor and preferably "doped" to form the actual airfoil surfaces of the wing.

A plurality of ribs 12 formed to give the desired camber are secured to the corrugated sheet 10 as by screws 13 so as to lie parallel to each other and to the flight path of the wing.

Extending from front and rear points of attachment to the ribs 12 and the sheet 10 as by the bolts 16 are braces or truss members 14, the fore and aft members that extend from each rib being united at apex with the corresponding pair from the adjacent rib. In this specific showing, the truss members are illustrated as having equal slope whereby they have a rectangular pyramidal form with the apices midway between the ribs. The truss members may, however, be offset to any desired amount without losing the effective rigidity of the structure. It may be desirable, for example, to dispose the apices or points of union in the plane of each rib whereby one side of each truss unit becomes vertical and may comprise an extension of the rib itself.

The torsional rigidity of the structure depends upon the rigidity of the truss members against fore and aft displacement of the apex points relative to the ribs which rigidity is not lost by the unsymmetrical disposition suggested which may be of advantage in reducing the number of angular engagements between the truss members and the wing surface. It must be understood that the ribs 12 and ends of the trusses 14 are restrained from motion in the surface of the wing by rigid attachments to the sheets 10 by the bolts 16, so that the elements so far described form a torsionally rigid series utilizing the sheet 10 as a major member of the bracing system.

Referring now particularly to Fig. 3, it will be seen that by the addition of the single longitudinal member 17 secured to the apices of the truss members as by the rivets 18 a complete truss structure is formed cooperating with the initially relatively weak wing surface member 10 to provide adequate strength and rigidity against lift, drag, torsional and reverse loads. It will also be evident that, due to its cambered and corrugated form, the relatively light and thin wing surface member will have great compression resistance in the short lengths between ribs whereby it is well adapted to the function of compression member in the truss structure.

High local loads will be generated at the ends of the truss members secured by the bolts 16 and to entrain a substantial area of the thin sheet 10 to resist these bearing loads, the bolts are preferably passed thru reinforcing pieces 20 well secured over an extended area of the sheet as by a large number of rivets.

Variations may be resorted to within the scope of the invention and portions of the improvements may be used without the others, whilst not departing from the spirit of the invention.

Having thus described my invention, I claim:

1. An airplane wing structure including in combination, a wing surface member, a plurality of ribs extending exteriorally fore and aft of said wing member, truss members having ends extending from said ribs and rigid against distortion fore and aft thereof, a member extending in spaced apart relation to the wing member and lengthwise thereof, the extended ends of the truss members from adjacent ribs being united together and to said lengthwise member.

2. In an airplane wing in combination, a wing surface member, ribs secured across said surface member, truss members extending from said surface and connected between adjacent ribs to restrain the surface member against torsional deflection, a longitudinal member secured to said connections to complete a truss comprising in end view a triangle whereof the wing surface is the base and the longitudinal member the apex.

3. In an airplane, a wing truss system triangular in end view and including in combination, a wing surface member defining the base of the triangle, a longitudinal member defining the apex disposed externally of said wing member, and a plurality of truss members in fixed relation with said wing member and the longitudinal member comprising the sides of said triangle as viewed in end aspect.

4. In an airplane wing, a truss structure having a generally triangular prismatic outline and including in combination, a wing surface member comprising a base of said prism, a longitudinal member at the apex disposed outside of the wing and diagonal members connected therebetween and lying in the sides of said prismatic form.

5. In an airplane in combination, a wing surface member and a longitudinal member comprising upper and lower members of a truss, diagonals connecting said members, and ribs secured across said surface and to ends of the diagonals; the other end of the diagonals from adjacent ribs being brought together at said longitudinal members and secured thereto.

6. In an airplane in combination, a wing surface member, a plurality of ribs secured to the member to maintain a fore and aft curvature therein, truss members extending from the ribs away from said surface, the members from adjacent ribs being united at their extended ends and a longitudinal member secured at said unions.

7. In an airplane, a plurality or ribs, a wing surface member secured to the ribs against bending transversely thereof, members having ends extending from the ribs and rigid against relative motion longitudinally thereof, the extended ends of the members from adjacent ribs being united, and a longitudinal member secured at said unions exteriorally of said wing member.

8. An exterior airplane wing bracing structure including in combination, a girder having the form of a triangle including a continuous sheet of material comprising a base, a longitudinal member comprising the apex thereof, and braces therebetween defining the sides of the triangular form; said sheet being included in the wing surface member.

9. An airplane wing and bracing system including in combination, a wing surface member, a plurality of ribs adapted to stiffen said member in camber, extensions from adjacent ribs united therebetween, and a longitudinal member spaced away from said surface member and secured to said unions.

10. A wing system including in combination, a wing surface member of sheet material having longitudinal elements such as corrugations of substantially greater depth than the thickness of the sheet, a smooth covering over said elements, ribs stiffening said sheet in camber, a longitudinal member spaced apart from said surface member, and truss members connecting adjacent ribs together and to the longitudinal member.

11. In an airplane structure in combination, a wing surface member of ribbed cross section and of a smooth exposed surface, fore and aft ribs secured across said wing surface ribs, diagonals connecting adjacent fore and aft ribs against torsional deflection of the surface member, and an external longitudinal member secured to said diagonals.

Signed at Keyport, in the county of Monmouth, and State of New Jersey this 18th day of March, 1929.

ROLAND CHILTON.